(12) United States Patent
Nanda

(10) Patent No.: US 6,848,022 B2
(45) Date of Patent: Jan. 25, 2005

(54) DISK ARRAY FAULT TOLERANT METHOD AND SYSTEM USING TWO-DIMENSIONAL PARITY

(75) Inventor: Sanjeeb Nanda, Winter Springs, FL (US)

(73) Assignee: Adaptec, Inc., Milpitas, CA (US)

( * ) Notice: Subject to any disclaimer, the term of this patent is extended or adjusted under 35 U.S.C. 154(b) by 57 days.

(21) Appl. No.: 10/263,422

(22) Filed: Oct. 2, 2002

(65) Prior Publication Data

US 2004/0078642 A1 Apr. 22, 2004

(51) Int. Cl.[7] .............................................. G06F 12/00
(52) U.S. Cl. ...................... 711/114; 711/111; 711/112; 711/113
(58) Field of Search ...................... 711/111–114; 714/6, 714/804

(56) References Cited

U.S. PATENT DOCUMENTS

| | | | | |
|---|---|---|---|---|
| 5,271,012 A | * | 12/1993 | Blaum et al. | 714/6 |
| 5,499,253 A | | 3/1996 | Lary | 714/770 |
| 5,513,192 A | * | 4/1996 | Janku et al. | 714/804 |
| 5,537,567 A | * | 7/1996 | Galbraith et al. | 711/114 |
| 5,579,475 A | * | 11/1996 | Blaum et al. | 714/7 |
| 5,737,744 A | * | 4/1998 | Callison et al. | 711/114 |
| 5,812,753 A | * | 9/1998 | Chiariotti | 714/6 |
| 6,138,125 A | * | 10/2000 | DeMoss | 707/202 |
| 6,148,430 A | | 11/2000 | Weng | 714/770 |
| 6,158,017 A | * | 12/2000 | Han et al. | 714/6 |
| 6,327,672 B1 | | 12/2001 | Wilner | 714/6 |
| 6,353,895 B1 | | 3/2002 | Stephenson | 714/5 |
| 6,532,548 B1 | * | 3/2003 | Hughes | 714/6 |

* cited by examiner

Primary Examiner—T Nguyen
(74) Attorney, Agent, or Firm—James H. Beusse; Beusse Brownlee Wolter Mora & Maire, P.A.

(57) ABSTRACT

A two-dimensional parity method and system that provides two-disk fault tolerance in an array of disks, such as a RAID system, is presented. The method includes arranging strips containing data in the disk array into horizontal and diagonal parity sets, each parity set including at least one data strip as a member and no single data strip is repeated in any one parity set. Horizontal XOR parities are calculated for each horizontal parity set and stored in a designated disk. Diagonal XOR parities are calculated for each diagonal parity set and at least some of the diagonal XOR parities are stored in a designated disk. The remaining diagonal parities are stored in a corresponding strip in a diagonal parity stripe so that no members of a contributing diagonal parity set have the same disk index as the disk index of the corresponding strip of the diagonal parity stripe.

33 Claims, 6 Drawing Sheets

| | | | | | | | | | | | | |
|---|---|---|---|---|---|---|---|---|---|---|---|---|
| $S_{1,1}$ | $S_{1,2}$ | $S_{1,3}$ | $S_{1,4}$ | ... | $S_{1,N-2}$ | $S_{1,N-1}$ | $S_{1,N}$ | $hP_1$ | $dP_1$ | |
| $S_{2,1}$ | $S_{2,2}$ | $S_{2,3}$ | $S_{2,4}$ | ... | $S_{2,N-2}$ | $S_{2,N-1}$ | $S_{2,N}$ | $hP_2$ | $dP_2$ | |
| $S_{3,1}$ | $S_{3,2}$ | $S_{3,3}$ | $S_{3,4}$ | ... | $S_{3,N-2}$ | $S_{3,N-1}$ | $S_{3,N}$ | $hP_3$ | $dP_3$ | |
| $S_{4,1}$ | $S_{4,2}$ | $S_{4,3}$ | $S_{4,4}$ | ... | $S_{4,N-2}$ | $S_{4,N-1}$ | $S_{4,N}$ | $hP_4$ | $dP_4$ | |
| ... | ... | ... | ... | | ... | ... | ... | ... | ... | |
| $S_{M-3,1}$ | $S_{M-3,2}$ | $S_{M-3,3}$ | $S_{M-3,4}$ | ... | $S_{M-3,N-2}$ | $S_{M-3,N-1}$ | $S_{M-3,N}$ | $hP_{M-3}$ | $dP_{M-3}$ | |
| $S_{M-2,1}$ | $S_{M-2,2}$ | $S_{M-2,3}$ | $S_{M-2,4}$ | ... | $S_{M-2,N-2}$ | $S_{M-2,N-1}$ | $S_{M-2,N}$ | $hP_{M-2}$ | $dP_{M-2}$ | |
| $S_{M-1,1}$ | $S_{M-1,2}$ | $S_{M-1,3}$ | $S_{M-1,4}$ | ... | $S_{M-1,N-2}$ | $S_{M-1,N-1}$ | $S_{M-1,N}$ | $hP_{M-1}$ | $dP_{M-1}$ | |
| $S_{M,1}$ | $S_{M,2}$ | $S_{M,3}$ | $S_{M,4}$ | ... | $S_{M,N-2}$ | $S_{M,N-1}$ | $S_{M,N}$ | $hP_M$ | $dP_M$ | |
| $dP_{M+1}$ | $dP_{M+2}$ | $dP_{M+3}$ | $dP_{M+4}$ | ... | $dP_{M+N-2}$ | $dP_{M+N-1}$ | | | | |

Disks (rows) / Stripes (columns)

| | | | | | | | | | |
|---|---|---|---|---|---|---|---|---|---|
| $dP_1$ | $dP_2$ | $dP_3$ | $dP_4$ | ... | $dP_{M-3}$ | $dP_{M-2}$ | $dP_{M-1}$ | $dP_M$ | |
| $hP_1$ | $hP_2$ | $hP_3$ | $hP_4$ | ... | $hP_{M-3}$ | $hP_{M-2}$ | $hP_{M-1}$ | $hP_M$ | |
| $S_{1,1}$ | $S_{2,1}$ | $S_{3,1}$ | $S_{4,1}$ | ... | $S_{M-3,1}$ | $S_{M-2,1}$ | $S_{M-1,1}$ | $S_{M,1}$ | $dP_{M+1}$ |
| $S_{1,2}$ | $S_{2,2}$ | $S_{3,2}$ | $S_{4,2}$ | ... | $S_{M-3,2}$ | $S_{M-2,2}$ | $S_{M-1,2}$ | $S_{M,2}$ | $dP_{M+2}$ |
| $S_{1,3}$ | $S_{2,3}$ | $S_{3,3}$ | $S_{4,3}$ | ... | $S_{M-3,3}$ | $S_{M-2,3}$ | $S_{M-1,3}$ | $S_{M,3}$ | $dP_{M+3}$ |
| ... | ... | ... | ... | | ... | ... | ... | ... | ... |
| $S_{1,N-3}$ | $S_{2,N-3}$ | $S_{3,N-3}$ | $S_{4,N-3}$ | ... | $S_{M-3,N-3}$ | $S_{M-2,N-3}$ | $S_{M-1,N-3}$ | $S_{M,N-3}$ | $dP_{M+N-3}$ |
| $S_{1,N-2}$ | $S_{2,N-2}$ | $S_{3,N-2}$ | $S_{4,N-2}$ | ... | $S_{M-3,N-2}$ | $S_{M-2,N-2}$ | $S_{M-1,N-2}$ | $S_{M,N-2}$ | $dP_{M+N-2}$ |
| $S_{1,N-1}$ | $S_{2,N-1}$ | $S_{3,N-1}$ | $S_{4,N-1}$ | ... | $S_{M-3,N-1}$ | $S_{M-2,N-1}$ | $S_{M-1,N-1}$ | $S_{M,N-1}$ | $dP_{M+N-1}$ |
| $S_{1,N}$ | $S_{2,N}$ | $S_{3,N}$ | $S_{4,N}$ | ... | $S_{M-3,N}$ | $S_{M-2,N}$ | $S_{M-1,N}$ | $S_{M,N}$ | |

Disks

Stripes

| $S_{M,N}$ | $dP_{M+N-1}$ | $dP_{M+N-2}$ | $dP_{M+N-3}$ | ... | $dP_{M+3}$ | $dP_{M+2}$ | $dP_{M+1}$ | | $dP_M$ |
|---|---|---|---|---|---|---|---|---|---|
| $S_{M,N}$ | $S_{M,N-1}$ | $S_{M,N-2}$ | $S_{M,N-3}$ | ... | $S_{M,3}$ | $S_{M,2}$ | $S_{M,1}$ | $hP_M$ | $dP_M$ |
| $S_{M-1,N}$ | $S_{M-1,N-1}$ | $S_{M-1,N-2}$ | $S_{M-1,N-3}$ | ... | $S_{M-1,3}$ | $S_{M-1,2}$ | $S_{M-1,1}$ | $hP_{M-1}$ | $dP_{M-1}$ |
| $S_{M-2,N}$ | $S_{M-2,N-1}$ | $S_{M-2,N-2}$ | $S_{M-2,N-3}$ | ... | $S_{M-2,3}$ | $S_{M-2,2}$ | $S_{M-2,1}$ | $hP_{M-2}$ | $dP_{M-2}$ |
| $S_{M-3,N}$ | $S_{M-3,N-1}$ | $S_{M-3,N-2}$ | $S_{M-3,N-3}$ | ... | $S_{M-3,3}$ | $S_{M-3,2}$ | $S_{M-3,1}$ | $hP_{M-3}$ | $dP_{M-3}$ |
| ... | ... | ... | ... | ... | ... | ... | ... | ... | ... |
| $S_{4,N}$ | $S_{4,N-1}$ | $S_{4,N-2}$ | $S_{4,N-3}$ | ... | $S_{4,3}$ | $S_{4,2}$ | $S_{4,1}$ | $hP_4$ | $dP_4$ |
| $S_{3,N}$ | $S_{3,N-1}$ | $S_{3,N-2}$ | $S_{3,N-3}$ | ... | $S_{3,3}$ | $S_{3,2}$ | $S_{3,1}$ | $hP_3$ | $dP_3$ |
| $S_{2,N}$ | $S_{2,N-1}$ | $S_{2,N-2}$ | $S_{2,N-3}$ | ... | $S_{2,3}$ | $S_{2,2}$ | $S_{2,1}$ | $hP_2$ | $dP_2$ |
| $S_{1,N}$ | $S_{1,N-1}$ | $S_{1,N-2}$ | $S_{1,N-3}$ | ... | $S_{1,3}$ | $S_{1,2}$ | $S_{1,1}$ | $hP_1$ | $dP_1$ |

Disks / Stripes

FIG. 6

DISK ARRAY FAULT TOLERANT METHOD AND SYSTEM USING TWO-DIMENSIONAL PARITY

BACKGROUND OF THE INVENTION

1. Field of the Invention

The present invention is generally related to disk array architectures, and, specifically, to disk array architectures that provide disk fault tolerance.

2. Related Art

It is known to store data in an array of disks managed by an array controller to control the storage and retrieval of data from the array. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as strips, or minor stripes. Distributed across the array of disks in rows, the identically sized partitioned strips form a data stripe across the entire array of disks. Therefore, the array contains stripes of data distributed as rows in the array, wherein each disk is partitioned into strips of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible. In a RAID 5 implementation, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) of all data blocks in the parity disks row. A RAID 6 architecture is similar to RAID 5, but RAID 6 can overcome the failure of any two disks by using an additional parity block for each row (for a storage loss of 2/N). The first parity block (P) is calculated with XOR of the data blocks. The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, and may necessitate the use of expensive special purpose hardware. Thus, implementation of Reed-Solomon codes in a disk array increases the cost, complexity, and processing time of the array.

In addition, other schemes have been proposed to implement two disk fault protection. One such scheme, described in U.S. Pat. No. 6,353,895, calculates parity sets for rows and columns of the array. However, this implementation is limited to a square array architecture having the same number of stripes as the number of disks. Another implementation uses the same number of parity disks as the number of disks in the array, making the implementation cost prohibitive. Other schemes use computationally complex mathematical methods, such as Galois field multiplication and commutative ring computation methods. Still other schemes restrict the total number of disks in the array to be a number one less than a prime number.

Thus, it would be desirable to provide system and method for implementing a two disk fault recovery architecture that is not subject to the foregoing drawbacks. That is, it would be desirable to provide a system and method that are not subject to the complex and computationally time-consuming array control functions encountered in known two disk fault tolerance implementations. In addition, it would also be desirable to provide a method that does not limit the size or configuration of the array. Further, it would be desirable to limit the number of additional disks required to implement two disk fault tolerance.

BRIEF SUMMARY OF THE INVENTION

Generally, the present invention fulfills the foregoing needs by providing in one aspect thereof, a method for providing two disk fault tolerance in an array of disks indexed and organized into a plurality of indexed stripes, each stripe including strips indexed by both disk and stripe, and each of the strips being located on a single disk. The method includes arranging strips containing data into horizontal and diagonal parity sets, each parity set including at least one data strip as a member and no single data strip being repeated in any one parity set. The method further includes calculating a horizontal parity for each horizontal parity set and calculating a diagonal parity for each diagonal parity set. The method also includes storing the calculated horizontal parity of each horizontal parity set in a strip of a horizontal parity disk. The method further includes storing at least some of the calculated diagonal parities of each diagonal parity set in a corresponding strip of a diagonal parity disk, and storing the remainder of the calculated diagonal parities in a corresponding strip in a diagonal parity stripe so that the diagonal parity is stored in a strip of the diagonal parity stripe whereby no members of a contributing diagonal parity set have the same disk index as the disk index of the corresponding strip of the diagonal parity stripe.

The present invention further provides, in another aspect thereof, a system for providing disk fault tolerance in an array of independent disks. The system includes an array of disks consecutively indexed and organized into indexed stripes. Each stripe further includes strips indexed by both disk and stripe, and each of the strips in any one of the stripes being located on a single disk. The system further includes an array controller coupled to the disk array and configured to arrange the strips containing data into horizontal and diagonal parity sets, each of the sets including at least one data strip as a member. The array controller is further configured to calculate the corresponding horizontal and diagonal parities for each of the parity sets, and to store each of the calculated parities in a corresponding strip.

BRIEF DESCRIPTION OF THE DRAWINGS

The features and advantages of the present invention will become apparent from the following detailed description of the invention when read with the accompanying drawings in which.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

Figure 1:
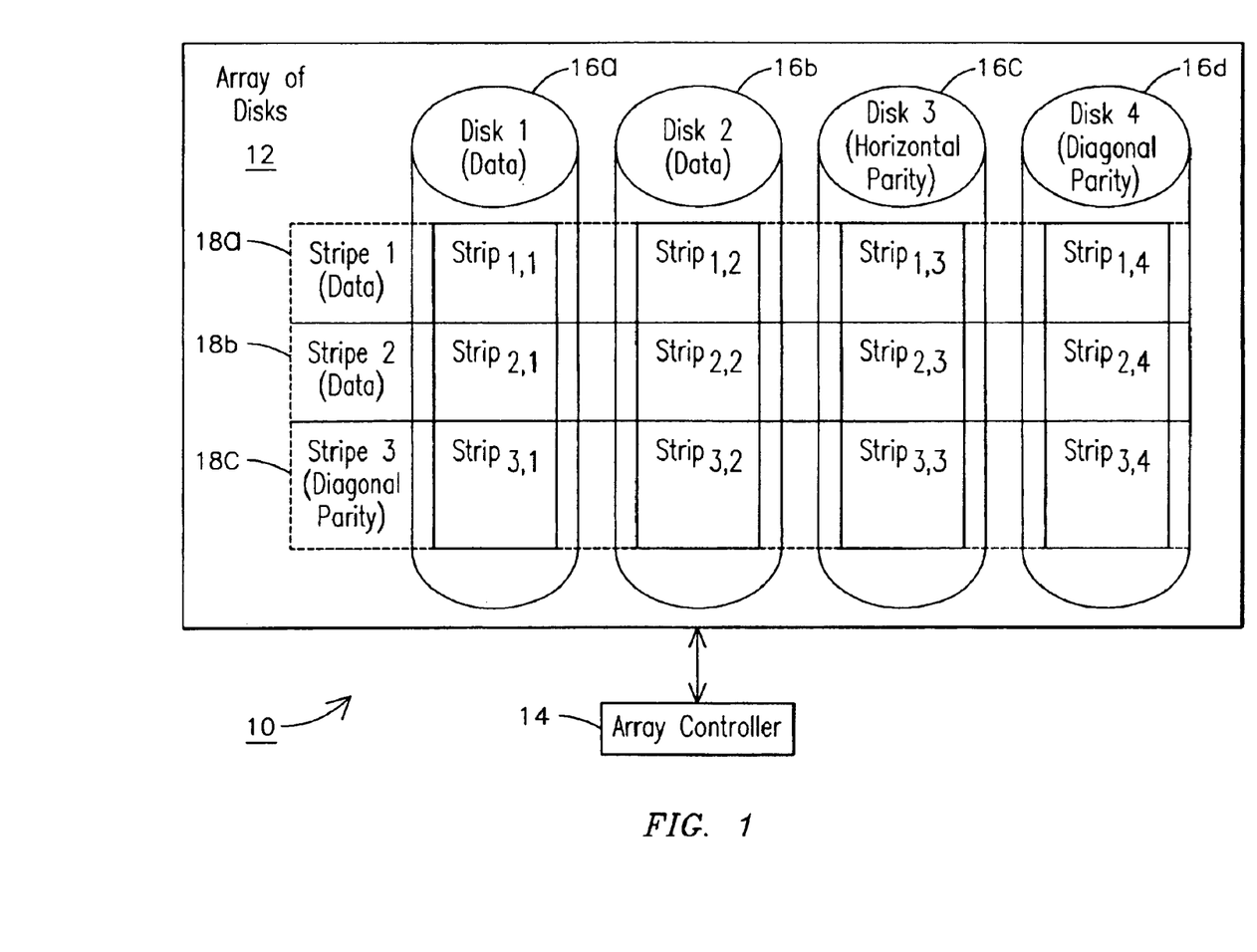
FIG. 1 illustrates a block diagram representation of a data storage system including an array controller and an array of disks.

FIG. 1 illustrates a data storage system 10 including an array of disks 12 for storing data and an array controller 14 for controlling the storage and retrieval of data in the array 12. In one aspect of the invention, the system 10 may be configured as a RAID 6 type architecture. The array controller 14, coupled to array of disks 12, allocates logical units, or strips, into logical rows, or stripes, extending across the physical disks in the array 12. According to one aspect of the invention, each disk in the array 12 is consecutively indexed, each stripe in the array is consecutively indexed, and each strip is indexed according to the corresponding disk and stripe membership. For example, the array 12 depicted in FIG. 1 includes four disks, disks 1–4 (16a–16d), allocated with three stripes, stripes 1–3 (18a–18c), so that each disk includes three strips indexed by both disk and stripe membership, and each stripe (18a–18c), includes four strips allocated across the disks (16a–16d.) Although FIG. 1, for the sake of simplicity of illustration, illustrates a four disk array 12 having two data disks (16a, 16b) and configured to include three stripes (18a–18c), it will be understood that the present invention is not limited to a specific number of disks (such as the number of data disks being one less than a prime number) and stripes, nor is it limited to a square data disk configuration ("N×N" data disks).

In one aspect of the invention, the array 12 is mapped by the array controller 14 to reserve two disks for storing array reconstruction information. In addition, the mapping includes a reservation of a stripe for storing additional reconstruction information. For example, the last, or highest indexed, two disks, disk 3 and 4 (16c and 16d), can be reserved, and the last, or highest indexed stripe, stripe 3 (18c), can be reserved. The remaining disks in the array, disks 1 and 2 (16a and 16b), can then be used to store data.

Figure 2:
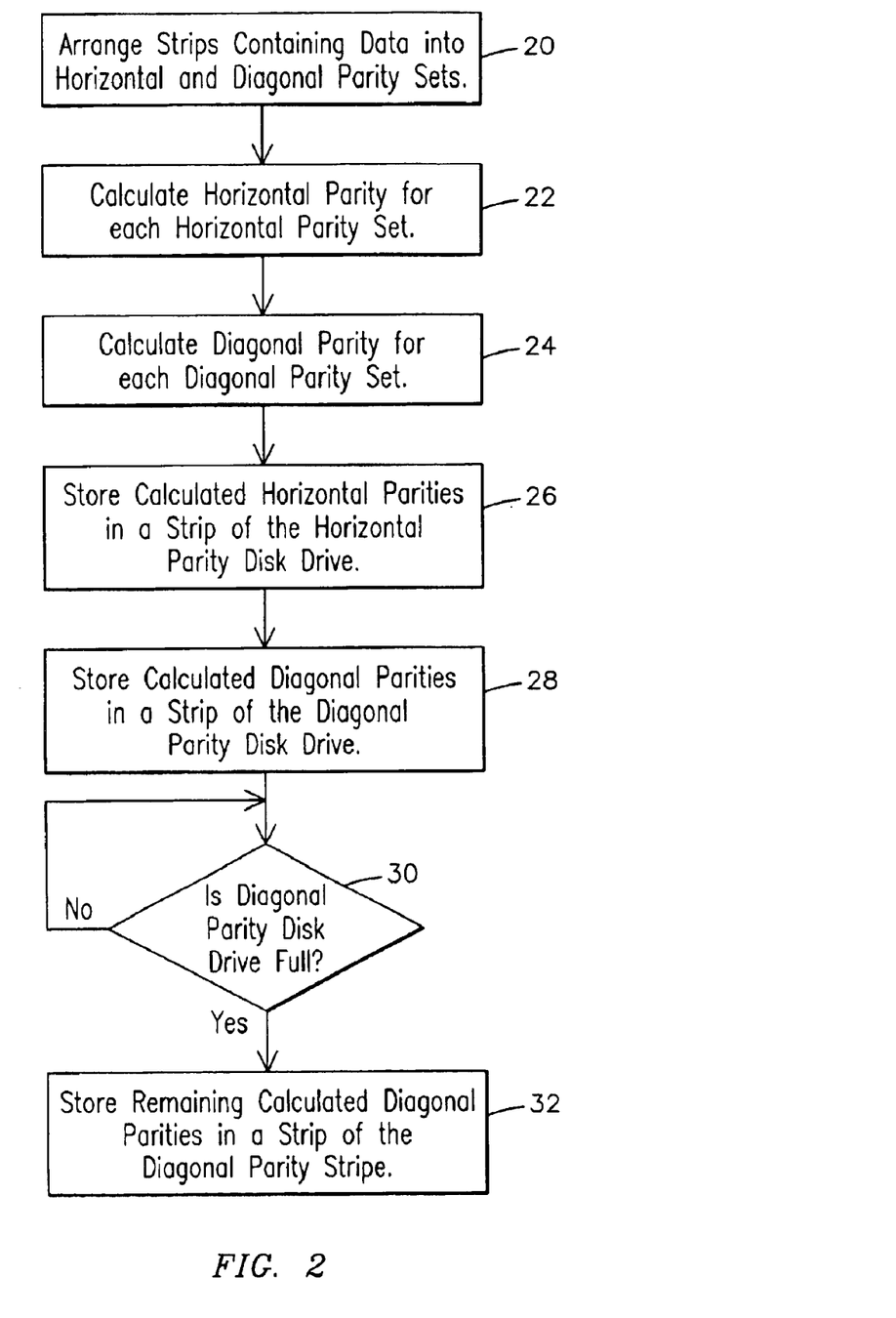
FIG. 2 is a flow chart illustrating a method of providing disk fault tolerance in an array of disks.

FIG. 2 is a flow chart illustrating a method of providing disk fault tolerance in an array of disks allocated as described above. The method can by implemented by the array controller 14, coupled to the array 12, and configured to perform the corresponding method steps. The method includes arranging strips containing data into horizontal and diagonal parity sets 20. For example, horizontal parity sets can be grouped across each stripe of the array containing data, and diagonal parity sets can be grouped across diagonals traversing the stripes in the array that contain data. In a further embodiment, diagonal parity sets can be grouped by establishing a first diagonal parity set as the data strip having the lowest disk and stripe index. Then, consecutive diagonal parity sets can be established by diagonally grouping the data strips adjacent to the previously established diagonal parity set until each data strip has been grouped into a respective diagonal parity set. In one aspect of the invention, each parity set comprises at least one data strip as a member, and no single data strip is repeated in any one parity set. For example, a single data strip contributes to only one horizontal parity set, and only one diagonal parity set.

Once the data array has been grouped into horizontal and diagonal parity sets, the horizontal parity for each horizontal parity set is calculated 22 using known parity algorithms. For example, a simple exclusive (XOR) of the information stored in each member of the horizontal parity set can be used to calculate the respective parity for each horizontal parity set. Then, the diagonal parity for each of the diagonal parity sets is calculated 24 using known parity algorithms, such as an XOR technique.

After the parities for the both the horizontal and diagonal parity sets are calculated, the parities are stored in the array so that data and parity information can be reconstructed in the event of a disk failure, such as the loss of two disks simultaneously. In an aspect of the invention, the parities are stored in reserved strips of the array, while the remaining unreserved strips are used for storing data. For example, a disk is reserved to store horizontal parity information, another disk is reserved to store diagonal parity information, and a stripe of the array is reserved to store additional diagonal parity information. Accordingly, the calculated horizontal parity of each horizontal parity set can be stored in a strip of the horizontal parity disk 26. For example, the horizontal parity for each parity set grouped in a stripe containing data can be stored in a strip of the corresponding stripe of the horizontal parity disk.

Next, the calculated diagonal parity of each diagonal parity set is stored in a strip of a diagonal parity disk 28. For example, the diagonal parity for each parity set grouped in a stripe containing data can be stored in a strip of the corresponding stripe of the diagonal parity disk. If the diagonal parity disk is filled 30 before all of the parities of the respective diagonal parity sets have been stored, then the remaining diagonal parities are stored 32 in a strip of the diagonal parity stripe having a smaller disk index than all contributing disk indexes of each data strip of the corresponding diagonal parity set. In one aspect of the invention, the calculated diagonal parities, beginning with the parity for the first diagonal parity set, is sequentially stored in a strip of the diagonal parity disk. When the diagonal parity strip on the next to highest indexed stripe is filled, the sequentially calculated diagonal parities are further stored, beginning with the strip on the lowest indexed disk, in the remaining diagonal parity stripe until the remaining calculated diagonal parities for each of the diagonal parity sets have been stored.

In an alternative embodiment, the diagonal parity sets can be grouped starting with the strip on the highest indexed stripe containing data and lowest indexed disk, and the diagonal parities stored accordingly. In another embodiment, the diagonal parity can be grouped starting at the highest indexed disk containing data and lowest indexed stripe, or alternatively, at the highest indexed stripe containing data and highest indexed disk containing data.

I. Creating the Logical Data and Parity Array

Figure 3:
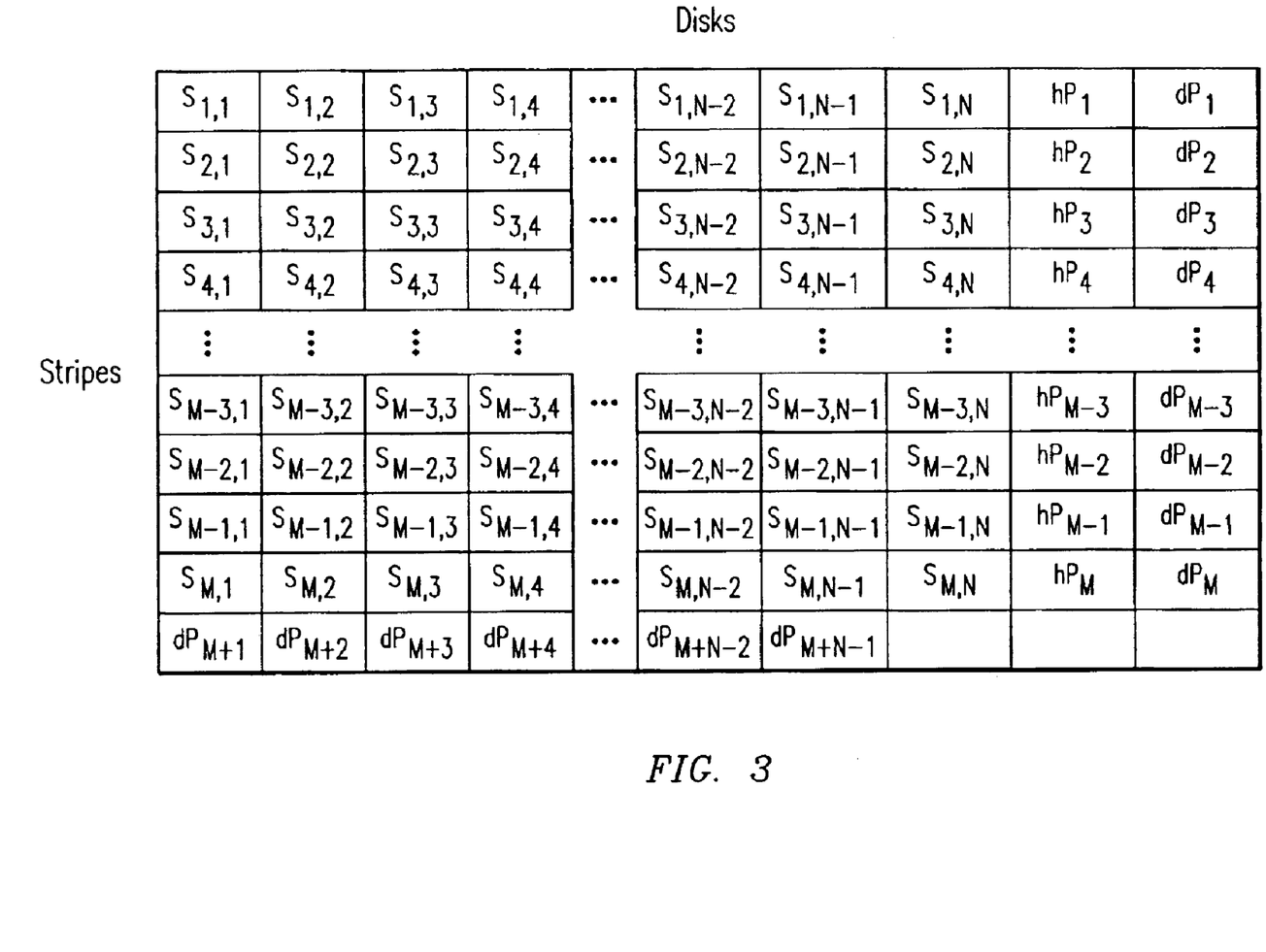
FIG. 3 illustrates an exemplary disk array storage format to implement disk fault tolerance using horizontal and diagonal parity.

FIG. 3 illustrates an exemplary disk array storage format to implement disk fault tolerance using horizontal and diagonal parity. In the two dimensional arrangement of FIG. 3, a column represents a disk, $d_i$, having index i, with each cell in a column representing a strip in the disk. In FIG. 3, $S_{m,n}$ represents a data stripe having a data stripe index of m and a data disk index of n, and $dP_i$ and $hP_i$ represent diagonal and horizontal parity strips, respectively, having index i. The rows in FIG. 3 represent the stripes in the array. In an aspect of the invention, the first N disks are data disks, and the last two disks (N+1, N+2) are parity disks. For example, disk N+1 is used to store horizontal parity, hP, and disk N+2 is used to store diagonal parity, dP. The first M stripes in the array are used to store data, and stripe M+1, which includes the last strip on each of the first N−1 data disks, is used to store additional diagonal parity information. Accordingly, disks 1 to N are used for storing data in stripes 1 to M In one aspect of the invention, horizontal parity sets are arranged across stripes containing data and the parity for each of the horizontal groups is stored in the corresponding strip in the horizontal parity disk. For example, the first horizontal parity set is grouped as $S_{1,1}$ to $S_{1,N}$ and the parity for the group is stored in strip $hP_1$. In another aspect of the invention, diagonal parity sets are arranged across diagonals traversing stripes containing data, and the parity for each of the diagonal groups is stored in the corresponding strip in the diagonal parity disk and then, the diagonal parity stripe. For example, the first diagonal parity set is grouped as $S_{1,1}$ and the parity for the group is stored in strip $dP_1$ The second diagonal parity set is grouped as $S_{2,1}$ and $S_{1,2}$ and the parity for the group is stored in strip $dP_2$. The next adjacent data strips are grouped diagonally, and the process continues until the diagonal parity disk is filled (i.e., diagonal parities for diagonal parity sets up to index M) For the next diagonal parity group, (i.e., diagonal parity group having index M+1) the diagonal parity is stored in a strip of the diagonal parity stripe so that all the contributing data strips of the diagonal parity set are at least one strip to the right of the strip used to store the diagonal parity for that group. The process of filling the diagonal parity stripe continues in this manner until the parities for the remaining diagonal parity sets are stored. (i.e., the diagonal parity set ending with set $S_{M,N}$.)

In a further aspect of the invention, the parities for each parity set are calculated using the XOR of the information in each data strip of the parity set according to the following formulas. For each horizontal parity set, the horizontal parity, $hP_i$, is calculated according to the equation:

$$hP_i = S_{i,1} \oplus S_{i,2} \oplus S_{i,3} \oplus \ldots S_{i,N}$$

where i is an index counter for the number of stripes in the array containing data, $S_{i,j}$ is the information stored in strip i of disk j, and N is the number of disks containing data.

For each diagonal parity set, the diagonal parity, $dP_i$, is calculated according to the equations:

$$dP_i = S_{1,i} \oplus S_{2,i-1} \oplus S_{3,i-2} \oplus \ldots S_{i,1}, \text{ for } i \leq N;$$

$$dP_i = S_{i-N+1,N} \oplus S_{i-N+2,N-1} \oplus S_{i-N+3,\,N-2} \oplus \ldots S_{i,1}, \text{ for } N < i \leq M; \text{ and}$$

$$dP_i = S_{i-N+1,N} \oplus S_{i-N+2,\,N-1} \oplus S_{i-N+3,N-2} \oplus \ldots S_{M,i-M+1}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

Figure 4:
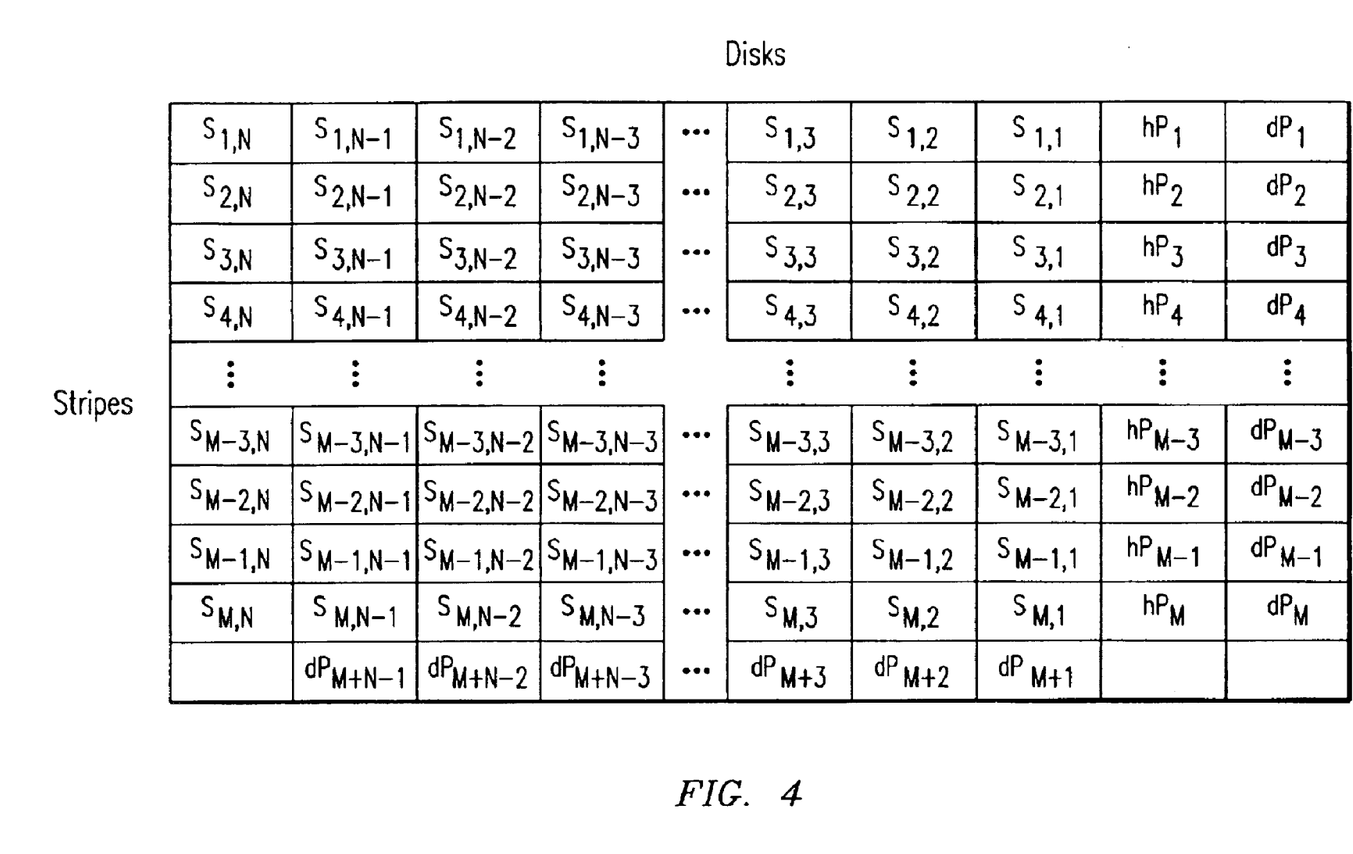
FIG. 4 illustrates a disk array storage format wherein the strips containing data are indexed starting from highest indexed disk containing data and the lowest indexed stripe containing data.
Figure 5:
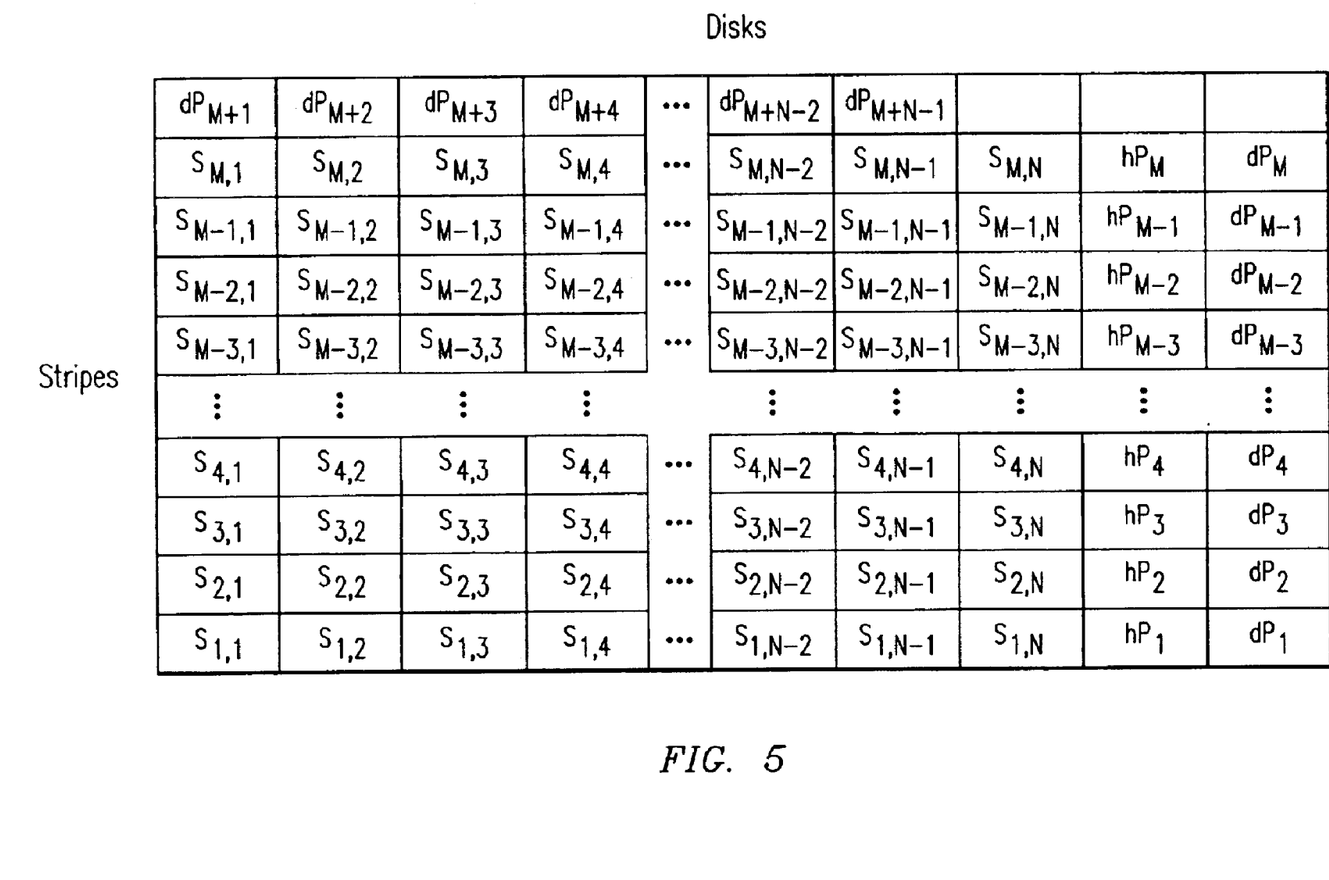
FIG. 5 illustrates a disk array storage format wherein the strips containing data are indexed starting from lowest indexed disk containing data and the highest indexed stripe containing data.
Figure 6:
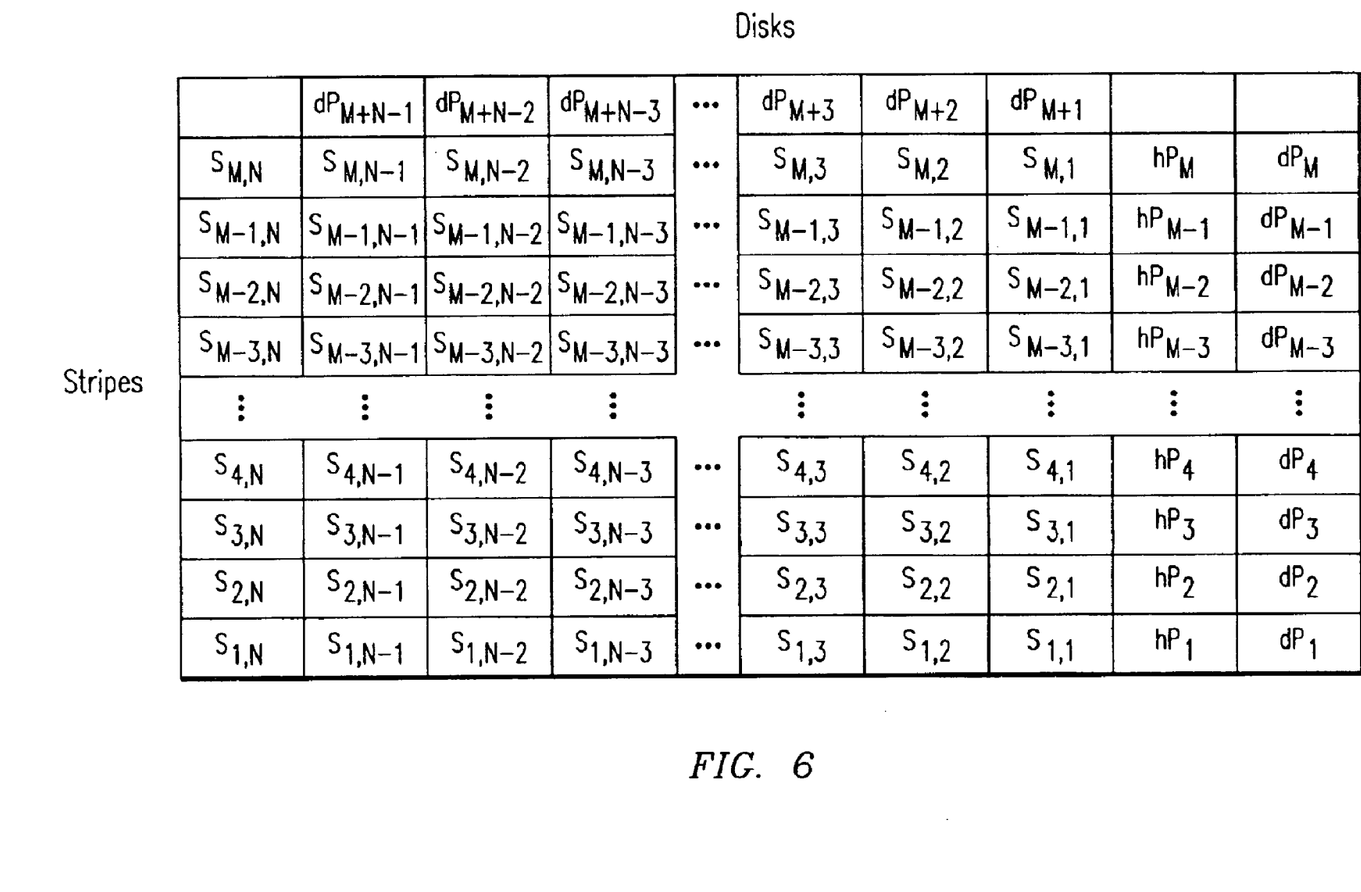
FIG. 6 illustrates a disk array storage format wherein the strips containing data are indexed starting from highest indexed disk containing data and the highest indexed stripe containing data.

FIGS. 4–6 illustrate embodiments for grouping parity sets and placing the resulting parity information in the array. In each of the embodiments, the formulas previously described are used to calculate the respective parity for each parity set. FIG. 4 illustrates a disk array storage format wherein the strips containing data are indexed starting from the highest indexed disk containing data and the lowest indexed stripe containing data. The data is then grouped into parity sets and the parity for each set is calculated and stored according to the formulas described above.

FIG. 5 illustrates a disk array storage format wherein the strips containing data are indexed starting from the lowest indexed disk containing data and the highest indexed stripe containing data. In addition, the diagonal parity stripe can be positioned on the first stripe of the array. The data is then grouped into parity sets and the parity for each set is calculated and stored according to the previously described formulas.

FIG. 6 illustrates a disk array storage format wherein the strips containing data are indexed starting from the highest indexed disk containing data and the highest indexed stripe containing data, and the diagonal parity stripe positioned on the first stripe of the array. The same formulas described above are then used to calculate and store the parity information to allow reconstruction of the data and parity.

In yet another aspect of the invention, the horizontal and diagonal parity columns can be positioned to the left or right of the N data disks. Thus, a variety of formatting schemes using horizontal and diagonal parities can be used by one skilled in the art to create the fault tolerant disk array using the techniques of the invention.

II. Recovering Data and Parity in the Array

Once the data is stored in the array according to the previous section, data and parity can be efficiently recovered for disk failure events, such as the simultaneous failure of two disks in the array. By using the stored horizontal parity, the diagonal parity, and the remaining data on the disks, the information on failed disks can be efficiently and quickly recreated.

A. Failure of Horizontal and Diagonal Parity Disks

In the case of the failure of the horizontal parity disk and the diagonal parity disks, the reconstruction of the parities is straightforward. Because the data disks remain intact, the horizontal parity for each horizontal parity set is recalculated and restored, and the diagonal parity for each diagonal parity set is recalculated and restored.

B. Failure of a Data Disk and the Horizontal Parity Disk

In the case of the failure of a data disk and the horizontal parity disk, reconstructing the lost data includes reconstructing each of the data strips of the failed data disk, starting with the strip on the lowest indexed stripe, by using the corresponding diagonal parity and the other members of the corresponding diagonal parity set. Then, if applicable, the diagonal parity strip of the failed disk is reconstructed by using the members of the corresponding diagonal parity set. Finally, each of the horizontal parity strips of the failed horizontal parity disk is reconstructed by using the members of the corresponding horizontal parity set.

In FIG. 3 for example, the strips of a failed disk $d_i$ are reconstructed starting with strip $S_{1,i}$ and proceeding to $S_{M,i}$ using diagonal parity information. If i<N, the diagonal parity, $dP_{M+i}$, is reconstructed using the corresponding data strips which are intact, because the failed data disk $d_i$ does not contribute members to calculation of the diagonal party $dP_{M+i}$. Finally, the horizontal parity disk is reconstructed using the previously intact data disks and the data disk that has been reconstructed.

C. Failure of a Data Disk and the Diagonal Parity Disk

In the case of a failed data disk and a failed diagonal parity disk, reconstructing the lost data includes reconstructing each of the data strips of the failed data disk, starting with the strip on the lowest indexed stripe, by using the corresponding horizontal parity and the other members of the corresponding horizontal parity set. Then the diagonal parity strip of the failed data disk is reconstructed using the members of the corresponding diagonal parity set. Finally, each of the diagonal parity strips of the failed diagonal parity disk is reconstructed using the members of the corresponding diagonal parity set.

In FIG. 3 for example, the strips of a failed disk $d_i$ are reconstructed starting with strip $S_{1,i}$ and proceeding to $S_{M,i}$ using horizontal parity information. If i<N, the diagonal parity, $dP_{M+i}$ is reconstructed using the corresponding data strips which are intact, because the failed data disk $d_i$ does not contribute members to calculation of the diagonal party $dP_{M+i}$. Finally the diagonal parity disk is reconstructed using the previously intact data disks and the data disk $d_i$ that has been reconstructed.

D. Failure of Two Data Disks

In the case of two failed disks, where one disk has a lower index, and the other disk having a higher index, data is reconstructed by starting at the strip on the lowest indexed stripe of the lower indexed failed data disk and the strip on the lowest indexed stripe of the higher indexed failed data disk. Data is then recreated in each of the failed disks by alternately reconstructing the data strip of the lower indexed failed data disk using the corresponding diagonal parity and the other members of the corresponding diagonal parity set. The data strip of the higher indexed failed data disk is then reconstructed using the corresponding horizontal parity and the other members of the corresponding horizontal parity set. The process is alternately repeated, until each data strip in each of the failed disks is reconstructed. Finally, each of the diagonal parity strips of the failed disks is reconstructed by using the members of the corresponding diagonal parity set.

In FIG. 3 for example, the disk having a lower index is designated as $d_i$, and the other disk having a higher index is designated $d_k$. Thus i<k. The data in each failed disk is alternately reconstructed starting with strip $S_{1,i}$ using the corresponding diagonal parity information. This is possible because the strips contributing to the diagonal parity for $S_{1,i}$ all occur to the left of disk $d_i$ or on the unique diagonal parity disk, which is intact. Then, strip $S_{1,k}$ is reconstructed using the corresponding horizontal parity information. Next, strip $S_{2,i}$ is reconstructed using the corresponding diagonal parity information followed by strip $S_{2,k}$ using the corresponding horizontal parity information. If disks i and k have been reconstructed up to stripe m−1, the diagonal parity information required to reconstruct strip $S_{m,i}$ (where m is the stripe, or row, index) is available because the strips on data disks needed to reconstruct strip $S_{m,i}$ are in rows less than m on disks to the right of it and on rows greater than m on disks to the left of it. The only potentially unavailable data strip required to reconstruct strip $S_{m,i}$ can be located on disk $d_k$. However, because disk $d_k$ is located to the right of disk $d_i$, the required data strip would have already been reconstructed using the method above before reconstruction of strip $S_{m,i}$ is started. Finally, the diagonal parity strip required to reconstruct strip $S_{m,i}$ is either located on the distinct diagonal parity disk or is located on a disk to the left of the disk containing strip $S_{m,i}$ wherein both disks are intact.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of providing disk fault tolerance in an array of independent disks, wherein the disks are indexed and organized into a plurality of indexed stripes, each stripe further comprising a plurality of strips indexed by both disk and stripe, each of the strips being located on only a corresponding single disk, the method comprising:

arranging strips containing data into horizontal and diagonal parity sets, wherein each parity set comprises at least one data strip as a member and no single data strip is repeated in any one parity set;

calculating a horizontal parity for each horizontal parity set;

calculating a diagonal parity for each diagonal parity set;

storing each respective calculated horizontal parity of each horizontal parity set in a corresponding strip of a horizontal parity disk; and storing at least some of the calculated diagonal parities of each diagonal parity set in a respective one of a plurality of strips of a diagonal parity disk and storing a remainder of the calculated diagonal parities in a respective one of a plurality of strips in a diagonal parity stripe so that no members of the diagonal parity set have the same disk index as the disk index of the respective one of the plurality of strips of the diagonal parity stripe.

2. The method of claim 1, wherein storing the remainder of the calculated diagonal parities further comprises storing the remainder in a diagonal parity stripe so that the diagonal parity is stored in a strip of the diagonal parity stripe having a smaller disk index than all contributing disk indexes of each data strip of the corresponding diagonal parity set.

3. The method of claim 1, wherein storing the remainder of the calculated diagonal parities further comprises storing the remainder in a diagonal parity stripe so that the diagonal parity is stored in a strip of the diagonal parity stripe having a larger disk index than all contributing disk indexes of each data strip of the corresponding diagonal parity set.

4. The method of claim 1, wherein calculating the horizontal and diagonal parities for each parity set comprises computing the exclusive-or (XOR) of the information in each data strip of each parity set.

5. The method of claim 1 further comprising:
reserving the horizontal parity disk to store horizontal parity;
reserving the diagonal parity disk to store diagonal parity;
reserving the diagonal parity stripe, across each of the disks in the array, to store diagonal parity; and
reserving the remaining unreserved strips in the remaining unreserved disks in the array for data.

6. The method of claim 1, wherein the step of arranging strips containing data into horizontal and diagonal parity sets further comprises:
grouping horizontal parity sets across each stripe of the array containing data; and
grouping diagonal parity sets across diagonals traversing the stripes in the array containing data so that none of the diagonal parity sets wrap around the array.

7. The method of claim 6, wherein the step of grouping diagonal parity sets further comprises:
establishing a first diagonal parity set as a data strip having the lowest disk and the lowest stripe index; and
establishing consecutive diagonal parity sets by diagonally grouping the data strips adjacent to the previously established diagonal parity set until each data strip has been grouped into a diagonal parity set.

8. The method of claim 6, wherein the step of grouping diagonal parity sets further comprises:
establishing a first diagonal parity set as a data strip having the lowest disk index and the highest stripe index; and
establishing consecutive diagonal parity sets by diagonally grouping the data strips adjacent to the previously established diagonal parity set until each data strip has been grouped into a diagonal parity set.

9. The method of claim 6, wherein the step of grouping diagonal parity sets further comprises:
establishing a first diagonal parity set as a data strip having the highest disk index and the lowest stripe index; and
establishing consecutive diagonal parity sets by diagonally grouping the data strips adjacent to the previously established diagonal parity set until each data strip has been grouped into a diagonal parity set.

10. The method of claim 6, wherein the step of grouping diagonal parity sets further comprises:
establishing a first diagonal parity set as a data strip having the highest disk index and the highest stripe index; and
establishing consecutive diagonal parity sets by diagonally grouping the data strips adjacent to the previously established diagonal parity set until each data strip has been grouped into a diagonal parity set.

11. The method of claim 1, wherein the step of calculating the horizontal parity further comprises calculating the horizontal parity of parity sets of data stored across each stripe containing data in the array.

12. The method of claim 11, wherein calculating the horizontal parity, $hP_i$, for each stripe containing data using the XOR of the information in each data strip is performed according to the equation:

$$hP_i = S_{i,1} \oplus S_{i,2} \oplus S_{i,3} \cdots \oplus S_{i,N}$$

where i is an index counter for the number of stripes in the array containing data, $S_{i,j}$ is the information stored in strip i of disk j, and N is the number of disks containing data.

13. The method of claim 1, wherein the step of storing the calculated horizontal parity for each horizontal parity set further comprises storing the calculated horizontal parity in a strip of the horizontal parity disk in the same stripe from which the associated horizontal parity set was grouped.

14. The method of claim 1, wherein the step of calculating the diagonal parity further comprises calculating the diagonal parity of parity sets of data stored across each diagonal traversing stripes containing data in the array.

15. The method of claim 14, wherein calculating the diagonal parity, $dP_i$, for each diagonal traversing the stripes containing data using the exclusive-or sum of the information in each diagonal is performed according to the equations:

$$dP_i = S_{1,i} \oplus S_{2,i-1} \oplus S_{3,i-2} \oplus \cdots S_{i,1}, \text{ for } i \leq N;$$

$$dP_i = S_{i-N+1,N} \oplus S_{i-N+2,N-1} \oplus S_{i-N+3, N-2} \oplus \cdots S_{i,1}, \text{ for } N<i \leq M; \text{ and}$$

$$dP_i = S_{i-N+1,N} \oplus S_{i-N+2, N-1} \oplus S_{i-N+3,N-2} \oplus \cdots S_{M,i-M+1}, \text{ for } M<i<M+N$$

where i is an index counter for the number of stripes containing data, $S_{ij}$ is the information stored in strip i of disk j, N is the number of disks containing data in the array, and M is the number of stripes containing data in the array.

16. The method of claim 1, wherein the step of storing the calculated diagonal parity for each diagonal parity set further comprises sequentially storing, beginning with the strip on the lowest indexed stripe, the calculated diagonal parity, beginning with the first diagonal parity set, in a strip of the diagonal parity disk; and, when the diagonal parity strip on the next to highest indexed stripe is filled, sequentially storing, beginning with the strip on the lowest indexed disk, the calculated diagonal parity for the remaining diagonal parity sets in the diagonal parity stripe until the calculated diagonal parities for each of the diagonal parity sets have been stored.

17. The method of claim 1, further comprising reconstituting lost data on two simultaneously failed disks by using the corresponding stored parity information and the data stored on the remaining functional disks.

18. The method of claim 17, wherein reconstructing the lost data comprises, in the case of a failed data disk and a failed horizontal parity disk:
reconstructing each of the data strips of the failed data disk, starting with the strip on the lowest indexed stripe, by using the corresponding diagonal parity and the other members of the corresponding diagonal parity set;
reconstructing the diagonal parity strip of the failed disk by using the members of the corresponding diagonal parity set; and
reconstructing each of the horizontal parity strips of the failed horizontal parity disk by using the members of the corresponding horizontal parity set.

19. The method of claim 17, wherein reconstructing the lost data comprises, in the case of a failed data disk and a failed diagonal parity disk:

reconstructing each of the data strips of the failed data disk, starting with the strip on the lowest indexed stripe, by using the corresponding diagonal parity and the other members of the corresponding diagonal parity set;

reconstructing the diagonal parity strip of the failed disk by using the members of the corresponding diagonal parity set; and reconstructing each of the diagonal parity strips of the failed diagonal parity disk by using the members of the corresponding diagonal parity set.

20. The method of claim 17, wherein reconstructing the lost data comprises, in the case of two failed disks, one disk having a lower index, and the other disk having a higher index:

starting at the strip on the lowest indexed stripe of the lower indexed failed data disk and the strip on the lowest indexed stripe of the higher indexed failed data disk;

alternately reconstructing the data strip of the lower indexed failed data disk by using the corresponding diagonal parity and the other members of the corresponding diagonal parity set, then reconstructing the data strip of the higher indexed failed data disk by using the corresponding horizontal parity and the other members of the corresponding horizontal parity set, until each data strip each of the failed disks are reconstructed; and reconstructing each of the diagonal parity strips of the failed disks by using the members of the corresponding diagonal parity set.

21. A system for providing disk fault tolerance in an array of independent disks, comprising:

an array of disks consecutively indexed and organized into a plurality of indexed stripes, each stripe further comprising a plurality of strips indexed by both disk and stripe; and an array controller coupled to the disk array and configured to arrange the strips containing data into horizontal and diagonal parity sets each having at least one data strip as a member, to calculate the corresponding horizontal and diagonal parities for each of the parity sets, to store each of the calculated horizontal parities in a corresponding strip to store at least some of the calculated diagonal parities of each diagonal parity set in a respective one of a plurality of strips of a diagonal parity disk, and to store a remainder of the calculated diagonal parities in a respective one of a plurality of strips in a diagonal parity stripe so that no members of the diagonal parity set have the same disk index as the disk index of the respective one of the plurality of strips of the diagonal parity stripe.

22. The system of claim 21, wherein the array controller is further configured to calculate a horizontal parity for each horizontal parity set, wherein a disk contributes at most one data strip to the calculation of a specific horizontal parity.

23. The system of claim 21, wherein the array controller is further configured to store the calculated horizontal parity of each horizontal parity set in a strip of a horizontal parity disk.

24. The system of claim 21, wherein the array controller is further configured to calculate a diagonal parity for each diagonal parity set, wherein a disk contributes at most one data strip to the calculation of a specific diagonal parity.

25. The system of claim 21, wherein the array controller is further configured to store the calculated diagonal parity of each diagonal parity set in a strip of a diagonal parity disk or a strip of a diagonal parity stripe so that the diagonal parity is stored in a strip of the diagonal parity stripe having a smaller disk index than all contributing disk indexes of each data strip of the corresponding diagonal parity set.

26. The system of claim 21, wherein the array controller is further configured to calculate the horizontal and diagonal parities for each parity set by computing the exclusive-or (XOR) of the information in each data strip of each parity set.

27. The system of claim 21 wherein the array controller is further configured to reserve the horizontal parity disk to store horizontal parity, reserve the diagonal parity disk to store diagonal parity, reserve the diagonal parity stripe, across each of the disks in the array, to store diagonal parity, and reserve the remaining unreserved strips in the remaining unreserved disks in the array for data.

28. The system of claim 21, wherein the array controller is further configured to group horizontal parity sets across each stripe of the array containing data strips and group diagonal parity sets across diagonals traversing the stripes in the array containing data so that none of the diagonal parity sets wrap around the array.

29. The system of claim 28, wherein the array controller is further configured to establish a first diagonal parity set as a data strip having the lowest disk and the lowest stripe index, and establish consecutive diagonal parity sets by diagonally grouping the data strips adjacent to the previously established diagonal parity set until each data strip has been grouped into a diagonal parity set.

30. The system of claim 21, wherein the array controller is further configured to calculate horizontal parity of parity sets of data stored across each stripe containing data in the array.

31. The system of claim 21, wherein the array controller is further configured to store the calculated horizontal parity in a strip of the horizontal parity disk corresponding to the stripe comprising the associated horizontal parity set.

32. The system of claim 21, wherein the array controller is further configured to calculate the diagonal parity of parity sets of data stored across each diagonal traversing stripes containing data in the array.

33. The system of claim 21, wherein the array controller is further configured to reconstitute lost data on two simultaneously failed disks in the array by using the corresponding stored parity information and the data stored on the remaining functional disks.

* * * * *